United States Patent
Li et al.

(10) Patent No.: US 11,517,980 B2
(45) Date of Patent: Dec. 6, 2022

(54) LASER WELDING STEEL TO DUCTILE IRON

(71) Applicant: GM GLOBAL TECHNOLOGY OPERATIONS LLC, Detroit, MI (US)

(72) Inventors: Huaxin Li, Rochester Hills, MI (US); Sen J. Zhou, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 895 days.

(21) Appl. No.: 16/269,147

(22) Filed: Feb. 6, 2019

(65) Prior Publication Data
US 2020/0246917 A1    Aug. 6, 2020

(51) Int. Cl.
| B23K 26/32 | (2014.01) |
| B23K 26/26 | (2014.01) |
| B23K 26/354 | (2014.01) |
| B23K 26/062 | (2014.01) |
| B23K 103/04 | (2006.01) |
| B23K 103/06 | (2006.01) |

(52) U.S. Cl.
CPC ............ B23K 26/32 (2013.01); B23K 26/062 (2015.10); B23K 26/26 (2013.01); B23K 26/354 (2015.10); *B23K 2103/04* (2018.08); *B23K 2103/06* (2018.08)

(58) Field of Classification Search
CPC .... B23K 26/32; B23K 26/062; B23K 26/354; B23K 26/26
USPC ........... 219/99, 121.64, 76.14; 228/106, 175, 228/226
See application file for complete search history.

(56) References Cited

U.S. PATENT DOCUMENTS

| 4,790,473 A | 12/1988 | Narasimhan et al. |
| 9,403,241 B2 * | 8/2016 | Wallin ................. B23K 35/365 |
| 2017/0129051 A1 * | 5/2017 | Li .......................... B23K 26/28 |

FOREIGN PATENT DOCUMENTS

| JP | S57139487 A | 8/1982 |
| JP | H01205893 A | 8/1989 |
| JP | 2001353587 A | 12/2001 |

OTHER PUBLICATIONS

Yu et al., "Laser welding of cast iron and carburized steel for differential gear," Journal of Mechanical Science and Technology, vol. 11 (2011) pp. 2887-2893.

(Continued)

*Primary Examiner* — Tu B Hoang
*Assistant Examiner* — Thomas J Ward
(74) *Attorney, Agent, or Firm* — Vivacqua Crane PLLC

(57) ABSTRACT

A method of laser welding a steel substrate and a ductile iron substrate is disclosed along with a laser welded assembly that may be formed by practicing the disclosed method. The disclosed laser welding method involves forming a laser weld joint between the steel and ductile iron substrates. The laser weld joint includes a fusion zone comprised of austenite ferrous alloy that has a composition derived from intermixing molten portions of the steel and ductile iron substrates as part of the laser welding process. The austenite ferrous alloy that constitutes the fusion zone of the laser weld joint has a carbon content of 2 wt % or more and a nickel equivalent of 60% or more and can be achieved without preheating the steel and ductile iron substrates prior to welding or using a filler wire to introduce a foreign metal into the molten substrate material created by the laser beam.

16 Claims, 3 Drawing Sheets

(56) References Cited

OTHER PUBLICATIONS

Zhang, U.S. Appl. No. 16/189,273 entitled "Fusion Welding of Ferrous Alloy Component Parts Using Low Carbon Steel Band," filed Nov. 13, 2018.

* cited by examiner

Table 1

STEEL COMPOSITIONS

| Standard | Symbols | Alloying Elements (wt%) | | | | | | |
|---|---|---|---|---|---|---|---|---|
| | | C | Si | Mn | P | S | Cr | Mo |
| JIS G 4805 | SUJ 2 | 0.95 to 1.10 | 0.15 to 0.35 | less than 0.50 | less than 0.025 | less than 0.025 | 1.30 to 1.60 | — |
| | SUJ 3 | 0.95 to 1.10 | 0.40 to 0.70 | 0.90 to 1.15 | less than 0.025 | less than 0.025 | 0.90 to 1.20 | — |
| | SUJ 4 | 0.95 to 1.10 | 0.15 to 0.35 | less than 0.50 | less than 0.025 | less than 0.025 | 1.30 to 1.60 | 0.10 to 0.25 |
| ASTM A 295 | 52100 | 0.93 to 1.05 | 0.15 to 0.35 | 0.25 to 0.45 | less than 0.025 | less than 0.015 | 1.35 to 1.60 | less than 0.10 |

Table 2

DUCTILE IRON COMPOSITIONS

| Alloying Elements (wt%) | | | | | |
|---|---|---|---|---|---|
| C | Si | Mn | P | S | Cr |
| 3.0 to 3.2 | 2.6 to 2.8 | less than 0.30 | less than 0.06 | less than 0.02 | less than 0.10 |

*FIG. 4*

LASER WELDING STEEL TO DUCTILE IRON

INTRODUCTION

The manufacture of certain articles—especially complex multi-component structures such as automobiles—may sometimes requires a steel substrate and a ductile iron substrate to be joined. The alloy content of the steel substrate and/or the ductile iron substrate has long complicated efforts to fusion weld the substrates together using a laser. Indeed, as the carbon content or the carbon equivalency of a ferrous alloy increases, the hardness of the alloy increases and, consequently, the weldability of the alloy decreases due to the formation hard and brittle microstructural phases (e.g., martensite) within the fusion zone of the weld joint and the surrounding heat-affected zone when the molten substrate material created during the prescribed laser welding operation solidifies rapidly. These hard and brittle microstructural phases are more susceptible to various forms of cracking including quench cracking from thermal shock and/or hydrogen induced cold cracking. The resultant lack of toughness or fracture resistance in the weld joint may ultimately increase the susceptibility of the joint to premature failure when subjected to loading.

Several methods have been utilized in the past to enhance the weldability of steel and ductile iron substrates. Notably, these previous efforts have called for preheating the steel and ductile iron substrates at the joining location as well as feeding a nickel-based filler wire into the laser beam to intermix a corresponding nickel alloy into the molten substrate material created by the laser beam. Preheating the steel and ductile iron substrates reduces the temperature variance between the molten steel and ductile iron material created by the laser beam and the colder, surrounding, unaffected base portions of the substrates. This helps minimize shrinkage stresses that can develop when the molten material solidifies, slows the rate of heat loss from the molten material and, consequently, the solidification rate of the molten material to help minimize the formation of hard microstructure phases, and allows hydrogen to escape from the molten material while solidifying. Each of these resulting effects can reduce the tendency of the finished weld joint to crack when stressed. The use of a nickel-based filler wire introduces foreign metal into the molten substrate material created by the laser beam and, thus, changes the composition of the molten substrate material to one that is less likely to form hard microstructural phases when solidified.

Implementing a preheating schedule and using a nickel-based filler wire are not always available options or at least not preferred in certain circumstances. For example, the steel and/or the ductile iron substrate may have been previously heat treated to achieve a certain set of mechanical properties through tempering or some other treatment. Preheating the substrate or introducing a foreign metal into the molten material created by the laser beam may upset the carefully-prescribed properties of one or both of the substrates and introduce uncertainty into the joining process and the ability of the substrates to perform as intended following welding. To that end, mechanical fasteners such as bolts, rivets, flow drill screws, and rivet nuts have typically been used to join steel and ductile iron substrates. Mechanical fasteners, however, add weight to the manufactured article and are time-consuming and labor intensive to install. An alternative technique for laser welding a steel substrate and a ductile iron substrate together that does not require preheating or the use of a nickel-based filler wire would therefore be advantageous.

SUMMARY OF THE DISCLOSURE

A method of laser welding a steel substrate and a ductile iron substrate according to one embodiment of the present disclosure includes several steps. One step involves abutting a faying surface of a steel substrate against a faying surface of a ductile iron substrate to define a weld seam between the substrates. The faying surfaces make interfacial contact to establish a faying interface that extends from the weld seam. Another step of the method involves directing a laser beam at the steel substrate and the ductile iron substrate. The laser beam has a central longitudinal axis. Still another step of the method involves forming a laser weld joint with the laser beam. The laser weld joint has a fusion zone comprised of austenite ferrous alloy that has a composition derived from the steel substrate and the ductile iron substrate. The fusion zone extends along the faying interface of the steel and ductile iron substrates to a depth and further intrudes into each of the steel substrate and the ductile iron substrate. A volume of the fusion zone that intrudes into the ductile iron substrate is greater than a volume of the fusion zone that intrudes into the steel substrate.

The method according to the aforementioned embodiment may include additional steps or be further defined. For example, the austenite ferrous alloy of the fusion zone may have a carbon content of 2 wt % or more, a chromium equivalent of 6% or less, and a nickel equivalent of 60% or more. As another example, the step of directing the laser beam at the steel substrate and the ductile iron substrate may comprise offsetting the central longitudinal axis of the laser beam towards the ductile iron substrate relative to the weld seam such that more of the laser beam impinges the ductile iron substrate than the steel substrate. Furthermore, in yet another example, the steel substrate and the ductile iron substrate may cooperate to define a groove, and the weld seam defined by the faying surface of the steel substrate and the faying surface of the ductile iron substrate may be located within the groove. And, in yet another example, the steel substrate may have a composition comprising iron, 0.60 wt % to 1.10 wt % carbon, 0.9 wt % to 1.80 wt % chromium, and 0.15 wt % to 0.70 wt % silicon, and the ductile iron substrate may have a composition comprising iron, 3.0 wt % to 4.2 wt % carbon, and 2.2 wt % to 3.0 wt % silicon.

The step of forming the laser weld joint in the method according to the aforementioned embodiment may include melting a portion of the steel substrate and a portion of the ductile iron substrate to create molten substrate material comprising intermixed steel material from the steel substrate and ductile iron material from the ductile iron substrate, and solidifying the molten substrate material into the laser weld joint by cooling the molten substrate material at a rate between 300° C./s and 600° C./s. In one implementation, melting the portion of the steel substrate and the portion of the ductile iron substrate comprises advancing a beam spot of the laser beam along the weld seam to form a trail of molten substrate material behind the beam spot. In another implementation, melting the portion of the steel substrate and the portion of the ductile iron substrate comprises pulsing the laser beam in place to create and grow a pool of molten substrate material beneath and outwardly from a beam spot of the laser beam.

A method of laser welding a steel substrate and a ductile iron substrate according to another embodiment of the present disclosure includes several steps. One step involves abutting a faying surface of a steel substrate against a faying surface of a ductile iron substrate to define a weld seam between the substrates. The faying surfaces make interfacial contact to establish a faying interface that extends from the weld seam. Another step of the method involves directing a laser beam at the steel substrate and the ductile iron substrate. The laser beam has a central longitudinal axis. Still another step of the method involves melting a portion of the steel substrate and a portion of the ductile iron substrate with the laser beam to create molten substrate material comprising intermixed steel material from the steel substrate and ductile iron material from the ductile iron substrate. Another step of the method involves solidifying the molten substrate material into a laser weld joint having a fusion zone comprised of austenite ferrous alloy that has a composition derived from the steel substrate and the ductile iron substrate. The fusion zone extends along the faying interface of the steel and ductile iron substrates to a depth and further intrudes into each of the steel substrate and the ductile iron substrate. The austenite ferrous alloy of the fusion zone has a carbon content of 2 wt % or more and a nickel equivalent of 60% or more.

The method according to the aforementioned embodiment may include additional steps or be further defined. For example, the step of solidifying the molten substrate material into the laser weld joint may comprise cooling the molten substrate material at a rate between 300° C./s and 600° C./s. In another example, a volume of the fusion zone that intrudes into the ductile iron substrate is greater than a volume of the fusion zone that intrudes into the steel substrate. In still another example, the step of directing the laser beam at the steel substrate and the ductile iron substrate may comprise offsetting the central longitudinal axis of the laser beam towards the ductile iron substrate relative to the weld seam such that more of the laser beam impinges the ductile iron substrate than the steel substrate. In yet another example, one implementation of the step of melting a portion of the steel substrate and a portion of the ductile iron substrate comprises advancing a beam spot of the laser beam along the weld seam to form a trail of molten substrate material behind the beam spot. Another implementation of the step of melting a portion of the steel substrate and a portion of the ductile iron substrate comprises pulsing the laser beam in place to create and grow a pool of molten substrate material beneath and outwardly from a beam spot of the laser beam.

The steel substrate and the ductile iron substrate of the method according to the aforementioned embodiment may have certain compositions. For instance, the steel substrate may have a composition comprising iron, 0.60 wt % to 1.10 wt % carbon, 0.9 wt % to 1.80 wt % chromium, and 0.15 wt % to 0.70 wt % silicon, and the ductile iron substrate may have a composition comprising iron, 3.0 wt % to 4.2 wt % carbon, and 2.2 wt % to 3.0 wt % silicon. Furthermore, in one implementation, a notch formed into the steel substrate and a notch formed into the ductile iron substrate may cooperate to define a groove, and the weld seam defined by the faying surface of the steel substrate and the faying surface of the ductile iron substrate may be located within the groove. Also, in a particular practice of the method according to the aforementioned embodiment, the steel substrate may be an outer race of a rolling bearing and the ductile iron substrate may be a rim of an offset sprocket.

A laser welded assembly according to one embodiment of the present disclosure includes a steel substrate, a ductile iron substrate, and a laser weld joint that fusion welds the steel substrate and the ductile iron substrate together. The laser weld joint has a fusion zone comprised of austenite ferrous alloy having a composition derived from the steel substrate and the ductile iron substrate. The fusion zone intrudes into each of the steel substrate and the ductile iron substrate, and the austenite ferrous alloy of the fusion zone has a carbon content of 2 wt % or more, a chromium equivalent of 6% or less, and a nickel equivalent of 60% or more. In one implementation of the aforementioned laser welded assembly, a volume of the fusion zone that intrudes into the ductile iron substrate is greater than a volume of the fusion zone that intrudes into the steel substrate.

BRIEF DESCRIPTION OF THE DRAWINGS

FIG. 4 includes two tables presenting preferred compositions for the steel substrate and the ductile iron substrate according to one embodiment of the present disclosure;

DETAILED DESCRIPTION

A method of laser welding a steel substrate and a ductile iron substrate is disclosed along with a laser welded assembly that may be formed by practicing the disclosed method. As will be further explained below, the disclosed laser welding method involves forming a laser weld joint between the steel and ductile iron substrates. The laser weld joint includes a fusion zone comprised of austenite ferrous alloy that has a composition derived from intermixing molten portions of the steel and ductile iron substrates as part of the laser welding process. The austenite microstructural phase (γ phase) of the ferrous alloy has a face-centered cubic (FCC) crystal lattice and is more ductile and has a much greater toughness (i.e., fracture resistance) than the metastable martensite microstructural phase that typically forms when ferrous alloys, including those of ductile iron and steel, are cooled rapidly from elevated temperatures. In the disclosed laser welding process, austenite ferrous alloy is produced in the fusion zone of the laser weld joint by ensuring that the molten substrate material created by the laser beam has a certain minimum carbon content and nickel equivalent content (which consequently are also present in the solidified ferrous alloy) and by controlling the cooling rate of the molten substrate material as it transitions into the laser weld joint.

Figure 1:
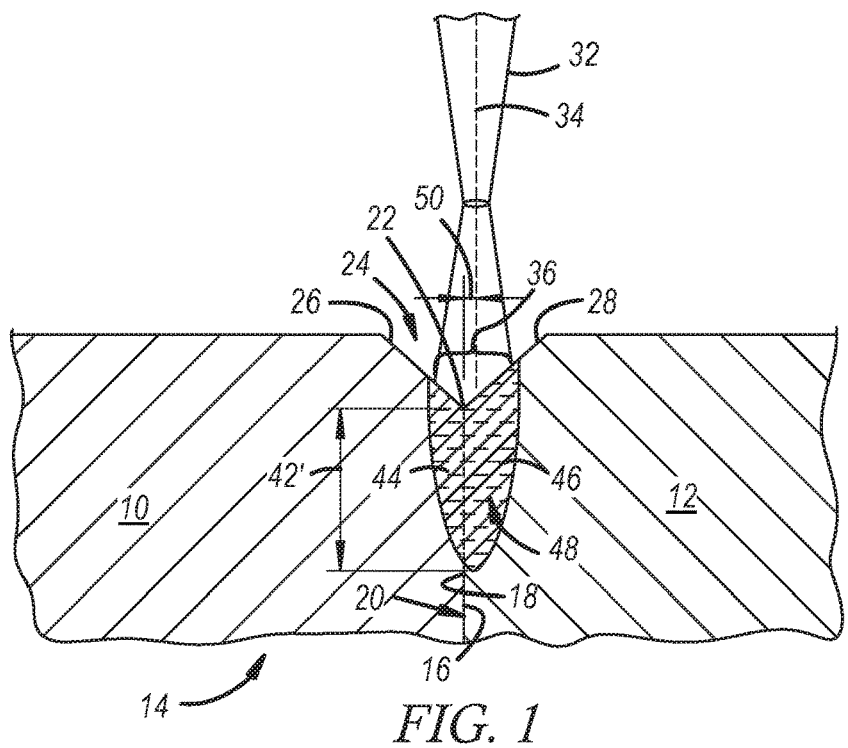
FIG. 1 is a cross-sectional view of a steel substrate and a ductile iron substrate during laser welding of the two substrates according to one embodiment of the present disclosure.
Figure 2:
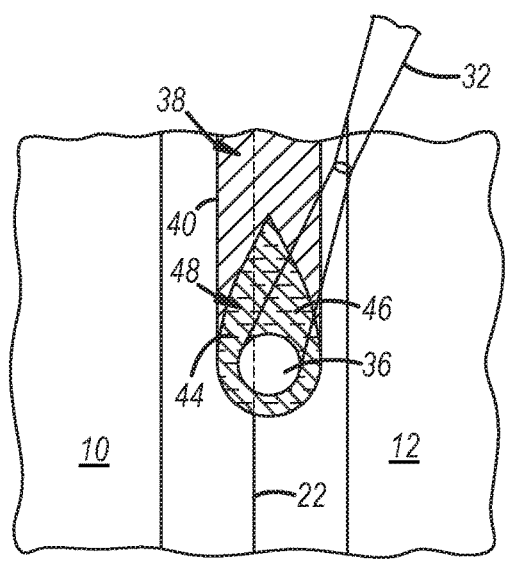
FIG. 2 is a plan view of the steel substrate and the ductile iron substrate depicted in FIG. 1 during laser welding taken along section line 2-2.
Figure 3:
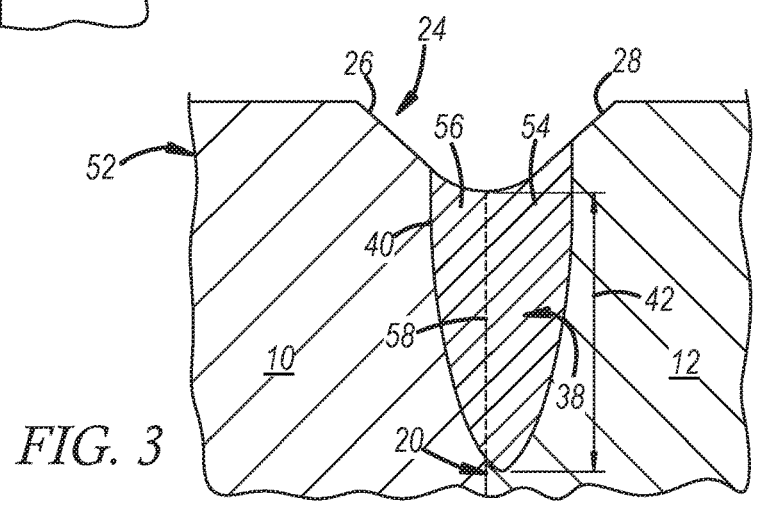
FIG. 3 is a cross-sectional view of the steel substrate and the ductile iron substrate depicted in FIGS. 1-2 along with a laser weld joint that fusion welds the two substrates together into a laser welded assembly.

Referring now to FIGS. 1-3, a preferred embodiment of the laser welding method is described. As shown in FIG. 1, the method involves bringing a steel substrate 10 and a ductile iron substrate 12 together into a workpiece 14 in preparation for laser welding. The steel substrate 10 is preferably a high carbon, chromium-containing low alloy steel having a composition that comprises iron as the main alloy constituent along with 0.60 wt % to 1.10 wt % carbon, 0.9 wt % to 1.80 wt % chromium, and 0.15 wt % to 0.70 wt % silicon, with a total amount of all alloying elements being 3 wt % or less. Several additional alloying elements that may also be present in the composition of the steel substrate include up to 1.80 wt % manganese, up to 0.025 wt % phosphorus, up to 0.025 wt % sulfur, and up to 0.25 wt % molybdenum along with industry accepted impurities. The steel substrate 10 may be carburized (i.e., case hardened) or uncarburized. If carburized, the steel substrate 10 has a core with the alloy composition described above and a carburized case that encases the core. The carburized case includes an additional 0.6 wt % to 1.0 wt % carbon infused into the substrate 10 to a case depth of usually 1-2 mm. The additional carbon is infused into the steel substrate 10 at an elevated temperature, e.g., 850° C. to 1090° C., at which the added carbon is dissolved in a solid solution of stable austenite phase of the steel, followed by quenching of the substrate, typically in oil or a water-based polymer solution, to transform the austenite phase of the steel within the case depth into the harder martensite phase.

The ductile iron substrate 12 has a composition that includes iron as a main alloy constituent along with 3.0 wt % to 4.2 wt % carbon and 2.2 wt % to 3.0 wt % silicon. Several additional alloying elements that may also be present in the composition include up to 1.0 wt % manganese, up to 0.06 wt % magnesium, up to 0.3 wt % nickel, up to 0.8 wt % molybdenum, up to 0.06 wt % phosphorus, up to 0.035 wt % sulfur, and up to 0.40 wt % copper along industry accepted impurities. Ductile iron has good torsional strength, impact and fatigue resistance, and wear resistance, and its enhanced ductility (compared to grey cast iron) can be attributed to the fact that precipitated carbon takes the shape of spherical graphite nodules that are dispersed within an iron-based matrix that usually includes pearlite and/or ferrite. The spherical graphite nodules are formed as a result of the nodulizing elements, such as magnesium, which interact with graphite precipitates and force isotropic growth into spheroids. When dispersed throughout the iron-based matrix, the spherical graphite nodules tend to inhibit the creation of cracks in response to stress. And while the compositions of the steel and ductile iron substrates 10, 12 are subject to some variance, the compositions of several commercially available steels and ductile irons suitable for the disclosed method are set forth in Tables 1 and 2, respectively, of FIG. 4.

When bringing the steel substrate 10 and the ductile iron substrate 12 together into the workpiece 14, a faying surface 16 of the steel substrate 10 abuts a faying surface 18 of the ductile iron substrate 12. These faying surfaces 16, 18 make direct contact while abutting and establish a faying interface 20 that extends from a weld seam 22. As shown best in FIG. 2, the weld seam 22 is the visible boundary line of the faying interface 20 at which the steel and ductile iron substrates 10, 12 begin to diverge away from the faying interface 20. In a preferred embodiment, the weld seam 22 is located within a groove 24 that is cooperatively defined by the steel substrate 10 and the ductile iron substrate 12. In particular, a notch 26, 28 amounting to half-groove may be formed into each of the steel substrate 10 and the ductile iron substrate 12. Each of the notches 26, 28 may be a chamfer notch having a slanted planar surface (as shown), an edge rabbet notch having two planar surfaces that intersect at an angle ranging from 80° to 130°, or an edge cove notch having a concave radiused surface, to name but a few options of intruding notch profiles. The groove 24 is not mandatory, however, to the practice of the disclosed laser welding method and, accordingly, need not necessarily be formed in all embodiments.

Once the steel and ductile iron substrates 10, 12 are brought together into the workpiece 14, which may be positioned and held in place by suitable fixturing equipment, a laser beam 32 is directed at the steel and ductile iron substrates 10, 12. The energy of the laser beam 32 propagates forward along a central longitudinal axis 34 of the laser beam 32. The laser beam 32 impinges each of the steel and ductile iron substrates 10, 12 while its energy is focused and distributed across a beam spot 36. The laser beam 32 may be a solid-state or a $CO_2$ laser beam, and it may be moved or advanced relative to the substrates 10, 12 and the weld seam 22 by aiming the laser beam 32 in a fixed orientation form a laser head and then moving the workpiece 14, the laser head, or both to achieve the desired relative movement of the laser beam and the substrates 10, 12. The laser beam 32, moreover, may be a continuous laser or a pulsed laser, and it can achieve a power density at the beam spot 36 sufficient to at least melt each of the steel and ductile iron substrates 10, 12 and, if desired, to additionally create a centralized and columnar keyhole comprised of vaporized metal and usually plasma directly beneath the laser beam 32.

A laser weld joint 38 (FIG. 3) that fuses the steel substrate 10 and the ductile iron substrate 12 together is then formed using the laser beam 32. The laser weld joint 38 has a fusion zone 40 comprised of austenite ferrous alloy that has a composition derived from, and is a combination of, the steel substrate 10 and the ductile iron substrate 12. A heat-affected zone (HAZ) is present outside of the laser weld joint 38 around the fusion zone 40. As shown in FIG. 3, the fusion zone 40 of the laser weld joint 38 extends along the faying interface 20 established between the faying surfaces 16, 18 of the steel and ductile iron substrates 10, 12 to a depth 42 that penetrates partially (as shown) or fully through the faying interface 20. The ferrous alloy that constitutes the fusion zone 40 is produced with the austenite microstructural phase—rather than the hard and brittle martensite microstructural phase—by furnishing the alloy with a certain chemical composition and solidifying the alloy from a molten state at a particular cooling rate. The combination of the chemical composition of the austenite ferrous alloy and the prescribed cooling rate is preferably achieved as described in more detail below.

The chemical composition of the austenite ferrous alloy that constitutes the fusion zone 40 includes a specified amount of carbon as well as a minimum nickel equivalent and, optionally, a maximum chromium equivalent. More specifically, the austenite ferrous alloy has a carbon content of 2 wt % or more, a nickel equivalent of 60% or more, and a chromium equivalent of 6% or less. Each of the nickel equivalent and the chromium equivalent is an empirical weight percent value that correlates the combined effects of different alloying elements to an equivalent amount of nickel and chromium, respectively. The nickel equivalent and the chromium equivalent are calculated by the following equations (all element abbreviations representing the weight percent of that particular element):

$$Ni\ eq.\ (wt\ \%) = Ni + (30 \times C) + (0.5 \times Mn)$$

$$Cr\ eq.\ (wt\ \%) = Cr + Mo + (1.5 \times Si) + (0.5 \times Nb)$$

In addition to the specified chemical composition, the ferrous alloy is solidified from a mass of molten substrate material created by the laser beam 32, as described below, at a cooling rate between 300° C./s and 600° C./s to help ensure an austenite microstructural phase.

Referring now specifically to FIGS. 1 and 2, one particular approach for producing the laser weld joint 38 with its austenite ferrous alloy fusion zone 40 is described. Here, as part of directing the laser beam 32 at the steel substrate 10 and the ductile iron substrate 12, the central longitudinal axis 34 of the laser beam 32 is offset towards the ductile iron substrate relative to the weld seam 22 such that more of the laser beam 32 impinges the ductile iron substrate 12 than the steel substrate 10. As a result, the beam spot 36 of the laser beam 32 still covers the weld seam 22, but a greater proportion of the beam spot 36 is projected onto the ductile iron substrate 12 compared to the steel substrate 10. At this point, forming the laser weld joint 38 includes melting a portion 44 of the steel substrate 10 and a portion 46 of the ductile iron substrate 12 with the offset laser beam 32 to create a collection of molten substrate material 48 that comprises an intermixture of steel material from the melted portion 44 of the steel substrate 10 and ductile iron material from the melted portion 46 of the ductile iron substrate 12. The molten substrate material 48 is then solidified into the laser weld joint 38 by cooling the molten substrate material 48 at a cooling rate between 300° C./s and 600° C./s. There are no size or shape constraints on the laser weld joint 38.

The laser weld joint 38 may be an elongated seam weld joint, as shown here, which can be a stitch in an overall stitch pattern or an entire continuous seam pattern. In that regard, melting the portions 44, 46 of the steel and ductile iron substrates 10, 12 involves advancing the beam spot 36 of the laser beam 32 relative to and along the weld seam 22 from one location on the weld seam 22 to another location on the weld seam 22. The advancement of the beam spot 36 forms a trail of molten substrate material 48 behind the forward movement of the beam spot 36 that extends depthwise along the faying interface 20 to a depth 42' as well as laterally into the substrates 10, 12. By offsetting the laser beam 32 towards the ductile iron substrate 12 during advancement of the beam spot 36, the portion 46 of the ductile iron substrate 12 that is melted by the laser beam 32 is greater in quantity by weight than the portion 44 of the steel substrate 10 that is melted, which in turn feeds a greater quantity of the more carbon-rich ductile iron material into the trail of molten substrate material 48 than the steel material. This ensures that the requisite minimum carbon content of 2 wt %, as well as the requisite minimum nickel equivalent and the maximum chromium equivalent are obtained within the molten substrate material 48 and, thus, the austenite ferrous alloy of the fusion zone 40 that solidifies therefrom. In many instances, an offset distance 50 between the weld seam 22 and the central longitudinal axis 34 of the laser beam 32 ranges from 0.010 mm to 0.200 mm, with the weight ratio of ductile iron material to steel material that feeds into the trail of molten substrate material 48 being increased as the offset distance 50 increases, and vice versa.

The trail of molten substrate material 48 created by the laser beam 32 solidifies when the energy input from the laser beam 32 ceases and the molten substrate material 48 cools by losing heat to the surrounding workpiece 14, as depicted in FIGS. 2 and 3. The beam characteristics of the laser beam 32 can dictate the cooling rate of the trail of molten substrate material 48 as it transitions into the austenite ferrous alloy that constitutes the fusion zone 40 of the laser weld joint 38. Indeed, the cooling rate is dependent on a number of factors, most notably the power of the laser beam 32, the travel speed of the laser beam 32 along the weld seam 22 (which affects the localized heat input into each of the steel and ductile iron substrates 10, 12), the dimensions of the trail of molten substrate material 48, and the absorptivity and thermophysical properties of the steel and ductile iron substrates 10, 12. The laser beam 32 can thus be controlled to obtain the desired cooling rate, which may be confirmed experimentally, by calculation, or by process modeling. For example, in one approach, the cooling rate of the trail of molten substrate material 48 may controlled to be between 300° C./s and 600° C./s by limiting the power level of the laser beam to 2 kW or less, limiting the travel speed of the beam spot 36 of the laser beam 32 along the weld seam 22 to 6 m/min or less, and limiting the depth 42' of the trail of molten substrate material 48 through the faying interface 20 (which ultimately equates to the depth 42 of the fusion zone 40 of the laser weld joint 38) to 3 mm or less.

The trail of molten substrate material 48 solidifies into the laser weld joint 38 to provide a laser welded assembly 52 in which the steel substrate 10 and the ductile iron substrate are fusion welded together by the joint 38. The laser welded assembly 52 is shown generally in FIG. 3. In this particular embodiment, the fusion zone 40 of the weld joint 38, in addition to extending along the faying interface 20 of the steel and ductile iron substrates 10, 12 to its depth 42, also intrudes laterally (i.e., in a direction transverse to the depth 42) into each of the steel substrate 10 and the ductile iron substrate 12. Due to the offset of the laser beam 32 towards the ductile iron substrate 12—thereby causing the portion 46 of the ductile iron substrate 12 that is melted by the laser beam 32 to be larger and greater in weight quantity than the portion 44 of the steel substrate 10 that is melted—a volume 54 of the fusion zone 40 that intrudes into the ductile iron substrate 12 is greater than a volume 56 of the fusion zone 40 that intrudes into the steel substrate 10. The demarcation between the intruding volumes 54, 56 of the fusion zone 40 is a restored plane 58 aligned along of the original faying interface 20 established between the steel and ductile iron substrates 10, 12.

The fusion zone 40 of the laser weld joint 38 is comprised of austenite ferrous alloy, which is ductile and tough compared to the martensite microstructural phase, and neither of the steel substrate 10 nor the ductile iron substrate 12 needs to be preheated to above room temperature (i.e., 25° C.) prior to impinging the substrates 10, 12 with the laser beam 32. The feeding of a filler wire into the laser beam 32 to introduce foreign metal into the trail of molten workpiece material 48 for purposes of altering the chemistry of the substrate material 48 also does not need to be practiced. The ability to avoid both preheating and the use of a filler wire is noteworthy because it helps to ensure that the mechanical properties of the steel and ductile iron substrates 10, 12 are not altered. In addition to forming austenite ferrous alloy in the fusion zone 40 while avoiding preheating and the use of a filler wire, the formation of the laser weld joint 38 within the groove 24 that is cooperatively defined by the steel substrate 10 and the ductile iron substrate 12 can enhance the functionality of the joint 38. By forming the laser weld joint 38 within the groove 24, any stress applied to the steel and/or ductile iron substrates 10, 12 in the vicinity of the weld joint 38 will invariably be directed to and concentrated in the weld joint 38 due to the increased deformability of the substrates 10, 12 at the location of the groove 24. Concentrating stress in the laser weld joint 38 may be preferred since the austenite ferrous alloy may be more resistant to fracture than the bulk metal of the steel substrate 10 and/or the ductile iron substrate 12.

Figure 5:
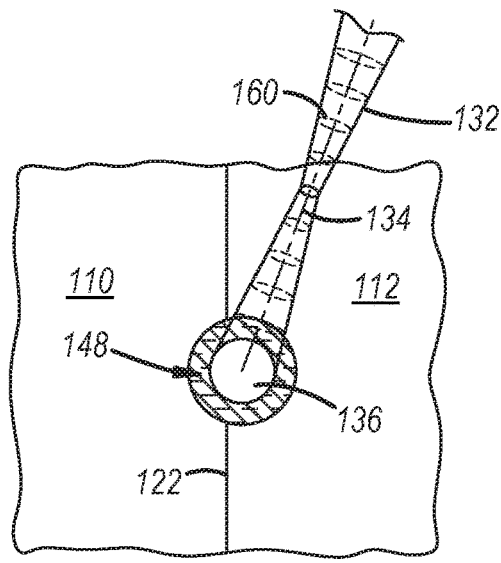
FIG. 5 is a plan view of a steel substrate and a ductile iron substrate during laser welding of the two substrates according to another embodiment of the present disclosure.
Figure 6:
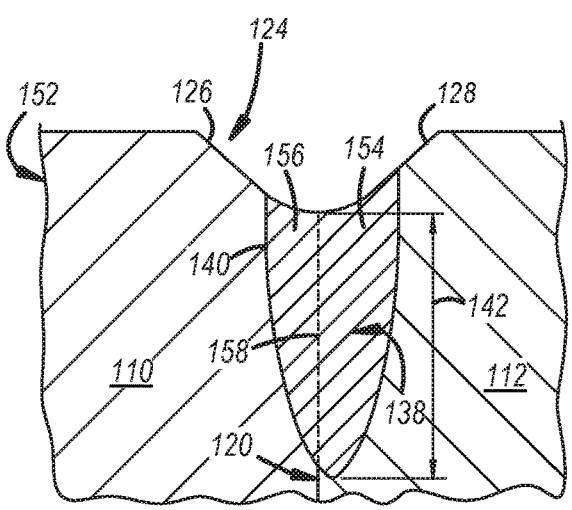
FIG. 6 is a cross-sectional view of the steel substrate and the ductile iron substrate depicted in FIG. 5 along with a laser weld joint that fusion welds the two substrates together into a laser welded assembly.

Referring now to FIGS. 5 and 6, another approach for deriving a laser weld joint 138 with its austenite ferrous alloy fusion zone 140 is described. In the following discussion of this particular embodiment, reference numerals that correspond to the reference numerals used in the description of the previous embodiment will be used to identify like elements having like functionality. To that end, the description of aspects of the previously-described embodiment shown in FIGS. 1-3 apply equally to aspects of the following embodiment that are identified with corresponding reference numerals unless specifically described otherwise. Only the material differences of the embodiment shown in FIGS. 5 and 6 will be discussed here. Specifically, in the present approach, the laser weld joint 138 may be a round (when viewed from above) spot weld joint as opposed to the elongated seam weld joint described above while preheating and the use of a filler wire are again not necessarily required. The laser welding method may utilize an offset laser beam 132 as described above for the same reasons related to obtaining a certain composition in the ferrous alloy contained in the fusion zone 140 of the weld joint 138. However, rather than advancing the beam spot 136 along the weld seam 122, the laser beam 132 is pulsed in place while the beam spot 136 remains fixed at a single location on the weld seam 122.

The pulsing of the laser beam 132 delivers laser energy in recurring optical pulses 160 that create and grow a pool of molten substrate material 148 beneath and outwardly from the beam spot 136 of the laser beam 132, as illustrated in FIG. 5. The average power of the laser beam 132 and the pulse repetition rate (i.e., pulses per second) can be controlled to achieve a pulse energy for each pulse 160 that, when delivered repetitively and in the aggregate, is sufficient to melt the steel and ductile iron substrates 110, 112 and to also grow the resultant pool of molten workpiece material 148 depthwise along the faying interface 120 to a depth and outwardly into the substrates 10, 12 to a specified size and volume, while also achieving the desired cooling rate of between 300° C./s and 600° C./s in the pool of molten substrate material 148 as it cools and solidifies into the laser weld joint 138. Upon solidifying, the fusion zone 140 of the resultant laser weld joint 138 extends along the faying interface 120 and penetrates partially (as shown) or fully through the faying interface 120. The fusion zone is comprised of austenite ferrous alloy, as before, while also having a volume 154 that intrudes into the ductile iron substrate 112 that is greater than a volume 156 of the fusion zone 140 that intrudes into the steel substrate 110 due to the offset of the laser beam 132 towards the ductile iron substrate 112. And, like before, to enhance the functionality of the laser weld joint 138, the joint 138 may be formed within the groove 124 that is cooperatively defined by the steel substrate 110 and the ductile iron substrate 112.

Figure 7:
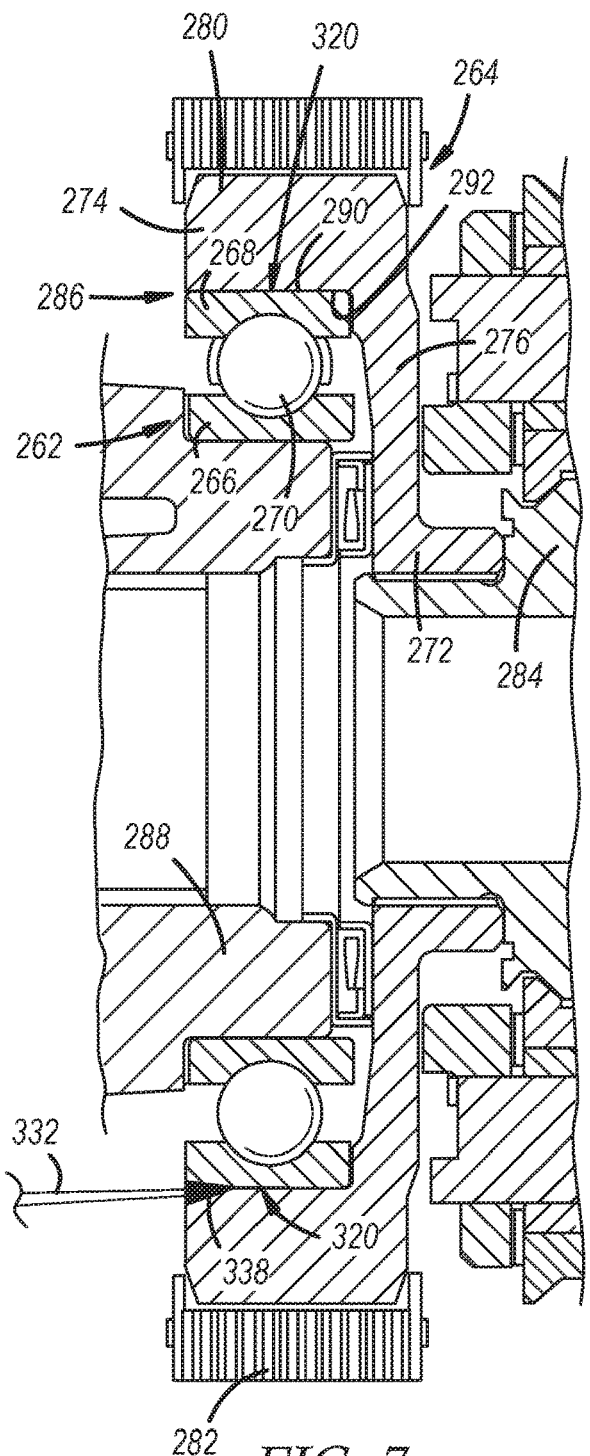
FIG. 7 is a cross-sectional view of a rolling bearing and an offset sprocket as operationally installed along with drawing depictions illustrating how the two components can be laser welded together according to practices of the present disclosure.

The laser welding method described herein, including the seam weld and spot weld approaches, may be applied in a variety of contexts. In one specific application, and referring now to FIG. 7, the method may be used fusion weld a rolling bearing 262 composed of steel and a sprocket 264 composed of ductile iron. The rolling bearing 262 may include an inner race 266 and an outer race 268 that have opposed outer and inner circumferential surfaces, respectively, between which a plurality of rolling elements 270, such as balls or rollers, are disposed. The sprocket 264 may be an offset sprocket that includes a central hub 272 along with an axially-extending rim 274 that depends from a flange 276 that extends radially from and circumferentially around the central hub 278. The axially-extending rim 274 includes a plurality of circumferentially-spaced external teeth 280 that mesh with a roller chain 282 to transmit torque. As shown in FIG. 7, the central hub 278 of the sprocket 264 may be splined or otherwise coupled to a shaft 284, such as a transmission output shaft, when installed and in operation. Traditionally, the rolling bearing 262 has been nested within a pocket 286 defined by the rim 274 of the sprocket 264 and maintained in place by an interference fit between the outer race 268 and the rim 274, thus allowing the sprocket 264 and the outer race 268 to rotate together, while the inner race 266 has been slide over and interference fit to a support hub 288 of a housing or other stationary structure.

In some instances, however, the rolling bearing 262 and, in particular, the outer race 268, may creep or walk axially away from the sprocket 264, which can reduce the operational life of the bearing 262. To address this issue, the presently-disclosed laser welding method may be employed to fusion weld the rolling bearing 262 and the sprocket 264 together. As applicable here, and in the context of the laser welding method described above, the outer race 268 of the rolling bearing 262 constitutes the steel substrate and the rim 274 of the offset sprocket 264 constitutes the ductile iron substrate. An outer circumferential surface 290 of the outer race 268 and an inner circumferential surface 292 of the rim 274 constitute the contacting faying surfaces that establish a faying interface 320 in the manner described above. A laser beam 332 may be directed at the steel and ductile iron substrates and operated to form a laser weld joint 338 that penetrates partially or fully through the faying interface 320 as described above. The laser weld joint 338 may be an elongated seam weld or spot weld depending on the design preferences and other manufacturing and/or product specifications. More than one such laser weld joint 338 may be formed between the substrates at various spaced apart locations around the annular faying interface 320 established between the outer race 268 of the rolling bearing 262 and the rim 274 of the offset sprocket 264.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of laser welding a steel substrate and a ductile iron substrate, the method comprising:
   abutting a faying surface of a steel substrate against a faying surface of a ductile iron substrate to define a weld seam between the substrates, the faying surfaces making interfacial contact to establish a faying interface that extends from the weld seam;
   directing a laser beam at the steel substrate and the ductile iron substrate, the laser beam having a central longitudinal axis; and
   forming a laser weld joint with the laser beam by melting a portion of the steel substrate and a portion of the ductile iron substrate to create molten substrate material comprising intermixed steel material from the steel substrate and ductile iron material from the ductile iron substrate, and solidifying the molten substrate material into the laser weld joint by cooling the molten substrate material at a rate between 300° C./s and 600° C./s, the laser weld joint having a fusion zone comprised of austenite ferrous alloy that has a composition derived from the steel substrate and the ductile iron substrate, the fusion zone extending along the faying interface of the steel and ductile iron substrates to a depth and further intruding into each of the steel substrate and the ductile iron substrate, and wherein a volume of the fusion zone that intrudes into the ductile iron substrate is greater than a volume of the fusion zone that intrudes into the steel substrate.

2. The method set forth in claim 1, wherein the austenite ferrous alloy of the fusion zone has a carbon content of 2 wt % or more, a chromium equivalent of 6 wt % or less, and a nickel equivalent of 60 wt % or more.

3. The method set forth in claim 1, wherein directing the laser beam at the steel substrate and the ductile iron substrate comprises offsetting the central longitudinal axis of the laser beam towards the ductile iron substrate relative to the weld seam such that more of the laser beam impinges the ductile iron substrate than the steel substrate.

4. The method set forth in claim 1, wherein melting a portion of the steel substrate and a portion of the ductile iron substrate comprises advancing a beam spot of the laser beam along the weld seam to form a trail of molten substrate material behind the beam spot.

5. The method set forth in claim 1, wherein melting a portion of the steel substrate and a portion of the ductile iron substrate comprises pulsing the laser beam in place to create and grow a pool of molten substrate material beneath and outwardly from a beam spot of the laser beam.

6. A method of laser welding a steel substrate and a ductile iron substrate, the method comprising:
abutting a faying surface of a steel substrate against a faying surface of a ductile iron substrate to define a weld seam between the substrates, the faying surfaces making interfacial contact to establish a faying interface that extends from the weld seam;
directing a laser beam at the steel substrate and the ductile iron substrate, the laser beam having a central longitudinal axis; and
forming a laser weld joint with the laser beam, the laser weld joint having a fusion zone comprised of austenite ferrous alloy that has a composition derived from the steel substrate and the ductile iron substrate, the fusion zone extending along the faying interface of the steel and ductile iron substrates to a depth and further intruding into each of the steel substrate and the ductile iron substrate, and wherein a volume of the fusion zone that intrudes into the ductile iron substrate is greater than a volume of the fusion zone that intrudes into the steel substrate,
wherein the steel substrate has a composition comprising iron, 0.60 wt % to 1.10 wt % carbon, 0.9 wt % to 1.80 wt % chromium, and 0.15 wt % to 0.70 wt % silicon, and wherein the ductile iron substrate has a composition comprising iron, 3.0 wt % to 4.2 wt % carbon, and 2.2 wt % to 3.0 wt % silicon.

7. The method set forth in claim 1, wherein the steel substrate and the ductile iron substrate cooperate to define a groove, and wherein the weld seam defined by the faying surface of the steel substrate and the faying surface of the ductile iron substrate is located within the groove.

8. A method of laser welding a steel substrate and a ductile iron substrate, the method comprising:
abutting a faying surface of a steel substrate against a faying surface of a ductile iron substrate to define a weld seam between the substrates, the faying surfaces making interfacial contact to establish a faying interface that extends from the weld seam;
directing a laser beam at the steel substrate and the ductile iron substrate, the laser beam having a central longitudinal axis;
melting a portion of the steel substrate and a portion of the ductile iron substrate with the laser beam to create molten substrate material comprising intermixed steel material from the steel substrate and ductile iron material from the ductile iron substrate; and
solidifying the molten substrate material into a laser weld joint having a fusion zone comprised of austenite ferrous alloy that has a composition derived from the steel substrate and the ductile iron substrate, the fusion zone extending along the faying interface of the steel and ductile iron substrates to a depth and further intruding into each of the steel substrate and the ductile iron substrate, and wherein the austenite ferrous alloy of the fusion zone has a carbon content of 2 wt % or more and a nickel equivalent of 60 wt % or more.

9. The method set forth in claim 8, wherein solidifying the molten substrate material into the laser weld joint comprises cooling the molten substrate material at a rate between 300° C./s and 600° C./s.

10. The method set forth in claim 8, wherein a volume of the fusion zone that intrudes into the ductile iron substrate is greater than a volume of the fusion zone that intrudes into the steel substrate.

11. The method set forth in claim 8, wherein directing the laser beam at the steel substrate and the ductile iron substrate comprises offsetting the central longitudinal axis of the laser beam towards the ductile iron substrate relative to the weld seam such that more of the laser beam impinges the ductile iron substrate than the steel substrate.

12. The method set forth in claim 8, wherein melting a portion of the steel substrate and a portion of the ductile iron substrate comprises advancing a beam spot of the laser beam along the weld seam to form a trail of molten substrate material behind the beam spot.

13. The method set forth in claim 8, wherein melting a portion of the steel substrate and a portion of the ductile iron substrate comprises pulsing the laser beam in place to create and grow a pool of molten substrate material beneath and outwardly from a beam spot of the laser beam.

14. The method set forth in claim 8, wherein the steel substrate has a composition comprising iron, 0.60 wt % to 1.10 wt % carbon, 0.9 wt % to 1.80 wt % chromium, and 0.15 wt % to 0.70 wt % silicon, and wherein the ductile iron substrate has a composition comprising iron, 3.0 wt % to 4.2 wt % carbon, and 2.2 wt % to 3.0 wt % silicon.

15. The method set forth in claim 8, wherein a notch formed into the steel substrate and a notch formed into the ductile iron substrate cooperate to define a groove, and wherein the weld seam defined by the faying surface of the steel substrate and the faying surface of the ductile iron substrate is located within the groove.

16. The method set forth in claim 8, wherein the steel substrate is an outer race of a rolling bearing, and the ductile iron substrate is a rim of an offset sprocket.

* * * * *